United States Patent [19]

Romeas et al.

[11] 4,106,058
[45] Aug. 8, 1978

[54] DATA DISC OPTICAL READER CONTAINING A DEVICE FOR AUTOMATIC DATA ACCESS

[75] Inventors: René Romeas; Michel Thomas, both of Paris, France

[73] Assignee: Thomson-Brandt, Paris, France

[21] Appl. No.: 788,923

[22] Filed: Apr. 19, 1977

[30] Foreign Application Priority Data

Apr. 23, 1976 [FR] France .................. 76 12067

[51] Int. Cl.² .................. G11B 7/12; H04N 5/76; G11B 19/14; G11B 21/08
[52] U.S. Cl. .................. 358/128; 179/100.3 N; 179/100.4 D; 360/78
[58] Field of Search .................. 250/570; 360/78; 179/100.3 V, 100.4 C, 100.4 D; 358/128; 274/9 RA, 41.6 S; 235/61.11 E

[56] References Cited

U.S. PATENT DOCUMENTS

| 3,530,447 | 9/1970 | Lambert | 179/100.4 D |
| 3,937,903 | 2/1976 | Osann, Jr. | 179/100.3 V |
| 3,944,727 | 3/1976 | Elliott | 358/128 |

Primary Examiner—Daryl W. Cook
Attorney, Agent, or Firm—Cushman, Darby & Cushman

[57] ABSTRACT

The invention concerns the reading by optical means of data recorded along a track on a disc; an address code, which increases one unit at each step, is recorded on the disc at the same time as the data. The optical reader contains a device for the fast movement of the reading head in a direction radial to the disc, a device for counting the number of track grooves thus crossed, a device for automatic access to some given data which contains a device for detecting addresses recorded and a programmed control circuit which triggers fast movement or a step by step movement of the reading head depending on whether the reading head is far from the track groove whose address has been recorded or is near to this track groove.

21 Claims, 10 Drawing Figures

DATA DISC OPTICAL READER CONTAINING A DEVICE FOR AUTOMATIC DATA ACCESS

The invention concerns reading by optical means data carriers in the form of discs on which a series of data has been recorded and is contained in a track which may be in one of two states that can be detected optically.

More especially the invention covers an optical data reader containing a device for automatic access to data identifiable by the automatic positioning of the reader's reading head with respect to the disc. The invention is more especially applicable to the access to any one of the tens of thousands of images which form the data recorded on a video disc.

A video disc contains a series of images recorded on a spiral track. In a typical arrangement, each rotation of the disc contains the data corresponding to one video image, i.e. to two frames. Known devices make it possible to restore at will the same image by moving the reading head backwards, once on each turn, a distance equal to the spiral's thread. This method is known under the name "stop on the image." Also, additional data forming a coded number can be introduced into the video signal, which is coded for the recording, these additional data being introduced on at least one line at the beginning of each image or each frame. These coded numbers form indices which can be assigned in succession to each image. The lines used for indexing are naturally chosen from among the video signal lines which are not used for the visible video signal, i.e. among the frame sweep return lines.

Hence it is possible to detect the index of an image read, to compare it with that of an image it is desired to read and, if there is no correspondence, to trigger a search instruction which will lead to the reading device reading another image.

The simplest search instruction is the one which causes the passage from one groove to the next and which is carried out during reading. In the most common case in which the code number is recorded at the beginning of each frame, this passage can be made twice for each turn of the track, reading advancing or going back one step after each half-turn of the track. The simplest search instruction corresponds then to the detection of 50 indices per second. For a disc on which 40,000 images have been recorded, such a device gives a search time in the worst case of the order of 13 minutes. This is unacceptable.

A more elaborate device consists in making, in a first search phase, called the rough phase, jumps of $n$ steps, $n$ being chosen in advance, then, when the differences between the index read and the index required is less than $n$, in changing the search instruction so that the reading device jump becomes step by step. As the lengths of the rough and fine search phases are to be added together, the total time is least when the two phases are of the same length. For a disc with 40,000 images and jumps of $n = 200$, a search time of 8 sec. is obtained. It is still too long for the application desired. Also, such a device has to have great "agility" in the radial servo-control of the reading device.

Another search method consists in recording additional coded information on the disc which represents, for example, the radial distance from each groove to the centre of rotation or to a groove taken as reference. These coded data, having been read and converted into a voltage, are compared with what is obtained from an analog radial position pick up.

The precision of such a radial position pick up cannot be greater than 1% for an acceptable manufacturing price. The rough search cannot be conducted to closer than 2% which, for 40,000 images, imposes a fine search in a range which may be 1600 images, i.e. a fine search time of 16 sec. in the worst case to which must be added the rough search time of 1 to 2 sec. All the devices thus described only give access to an image in a time which is considered too long; the device in accordance with the invention gives access to a previously chosen image in a much shorter time.

The automatic access device in accordance with the invention also has two search phases. The first is a rough search phase obtained by a quick radial movement of the reading device a number $n$ of track grooves which is predetermined by the numerical difference between the starting index and the one required. The reading signal contains data at each crossing of a groove and it is thus possible to count the number of grooves crossed from a fixed reference position. The second is a fine search phase in which the reading device makes step by step jumps, the image index being read on both frames and compared with the index of the image to be obtained. Access times are thus considerably reduced since it is possible, in the present state of the art, to cross the complete disc in less than 1 sec., the positioning error being evaluated at ± 10 grooves. This error gives a maximum fine search time of 0.4 sec. The access time is therefore of the order of 1.5 sec.

According to the invention, there is provided an optical reader for data carrier disc, said data being recorded along a track formed of concentric grooves, said track containing a succession of alternate elements optically detectable, adresses for said grooves formed by coded numbers being recorded at the same time as said data on each corresponding groove, said optical reader comprising a radiating source, a reading head intended to receive the radiation and to focus it on said track, a rotating device causing said disc to rotate, a detecting device for detecting the radiation coming from said track and supplying an electrical signal, a demodulation device, for demodulating said electrical signal, having an output delivering a demodulated signal and a device for automatic access to the data recorded on said disc, said automatic access device comprising an address detection device intended to supply a detected address formed by a coded number, a rough search device to position said reading head from an initial groove to a predetermined distance from the track groove required, said required groove being identified by the recording of its address $a_x$ in a memory logic circuit, and a fine search device intended to make the said recorded address $a_x$ and the detected address coincide.

For a better understanding of the present invention and to show how the same may be carried into effect, reference will be made to the following description and the attached drawings among which.

Figure 1:
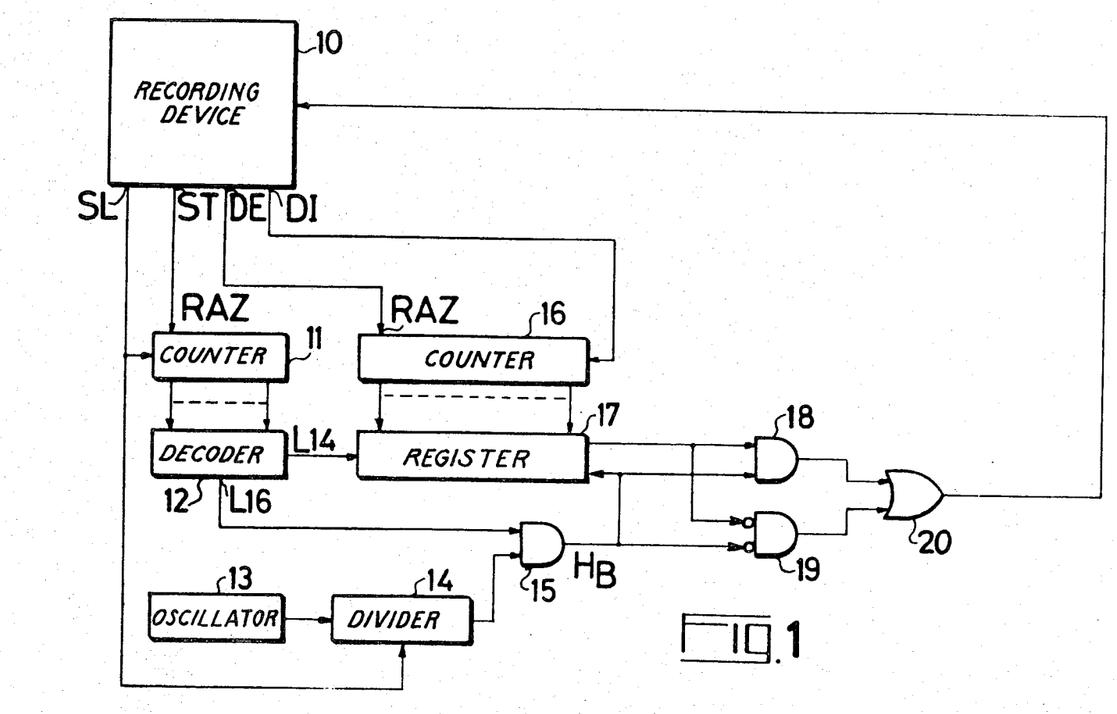
FIG. 1 shows a device giving an address signal, to be recorded on the disc, which is produced for each item of data.

The automatic access device complying with the invention uses, in one of its operating phases, image addresses detected on the data carrier disc, these addresses having previously been recorded at the same time as the data. The device supplying this address signal to be recorded on the disc for each image is shown, as an example, on FIG. 1. It contains a device 10 for recording on discs of a classical type which will not be described; this recording device contains detector circuits to restore the line synchronizing signal SL, the frame synchronizing signal ST, a signal formed of pulses coinciding with the start of the images DI and a signal for the start of recording DE. These different signals are used to produce the addresses to be recorded as follows:

The line synchronizing signal SL is received by a line counter 11 which is reset to zero by the frame synchronizing signal ST; this counter may be a binary counter. The parallel outputs of this counter are applied to a two-output detector 12 which supplies two signals L14 and L16 formed of pulses which coincide with the beginning of line 14 and line 16 respectively in each frame. These signals enable the address signals to be recorded in the case of a video disc on the 625 lines standard in lines 16 and 329 for preference. These lines tend to be accepted in present standards as usable for the insertion of any data of a special kind. The address signals are recorded on the disc in two-phase binary code, logic levels 1 and 0 being placed between the black and white levels.

In the description of the invention, a disc on which the address code has been recorded during the 16$^{th}$ line has been used as an example. This is therefore the arrangement which is described in connection with FIG. 1.

An address counter 16 receives the image start pulses DI and is reset to zero by the recording start pulse DE. It supplies the address of each image in BCD. The signal L14 coinciding with the start of line 14 in each frame is applied to the loading input of 20 stages register 17 whose inputs are connected to the outputs of counter 16. This register has an output at which its content is transferred serially at the rate F of the pulses of clock $H_B$. This clock signal is obtained from a local oscillator whose frequency is 16F; the output of this oscillator 13 is connected to the input of a divider by 16 circuit, 14, which is reset to zero by the line synchronizing signal SL. Signal $H_B$ is applied to the first input of an AND gate 15 whose second input receives a logic 1 level signal for the length of line 16. AND gate 15 supplies pulses at frequency F for the length of line 16, which are applied, on the one hand, to the timer input of shift register 17 and, on the other, to the input of AND gate 18 whose other input receives the output signal of register 17 and finally to the first inverted input of AND gate 19 whose other input, which is also inverted, receives the output signal of register 17.

The outputs of gates 18 and 19 are connected to the inputs of OR gate 20 which then supplies at its output the two-phase coded address signal which is added to the data signal in recording device 10.

Figure 2:
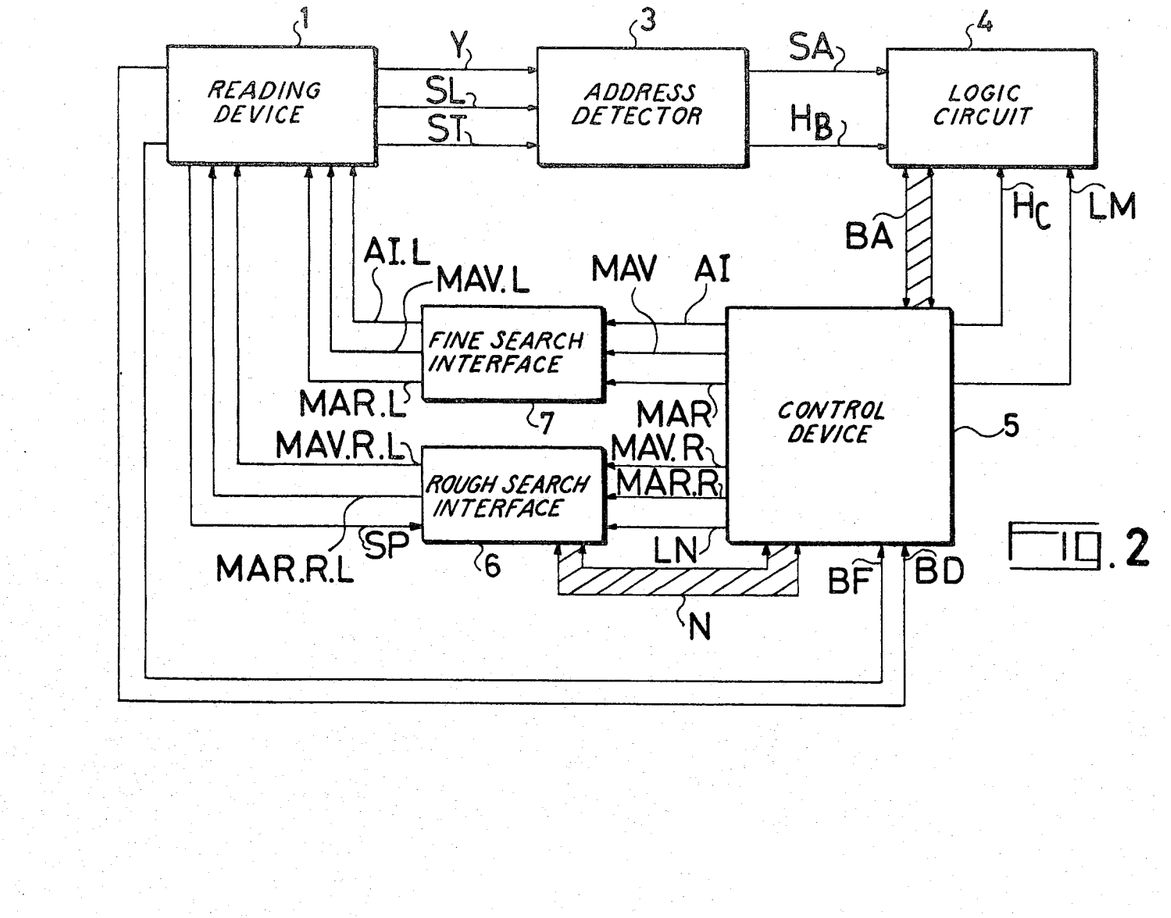
FIG. 2 is a block schematic of an optical reader in accordance with the invention containing an automatic access device.

The video disc optical reader with automatic access to one item of data on the disc is shown in FIG. 2. It contains elements which will be described in succession in what follows. In particular, a reading device 1 which supplies two sorts of signals: on the one hand the luminance signal Y, the line synchronizing signal SL and the frame synchronizing signal ST coming from the reading cells after decoding treatment and, on the other, a starting point signal BD and a finishing point signal BF supplied respectively by picks up fitted on the inside and outside of the disc to detect the ends of the track recorded and a track jump signal SP coming from a detector of the number of grooves jumped.

Reading device 1 is also intended to receive control signals which act on a fast motor that controls the fast movement of the reading head assembly with respect to the disc, the signals being MAV.R.L. for forward motion and MAR.R.L. for backward motion respectively, and on a step by step motor that controls the movement from one groove to the next one of the reading head, the signals being MAV.L for forward motion and MAR.L for backward motion respectively and AI.L for a stop on an image, the letter L showing that these signals concern the control of reading. The reader also has a device for normal forward motion whose direction can be reversed, which is used for reading in the normal mode. Signals Y, SL and ST are supplied by the reading device to address detector 3 which supplies, on the one hand, an address signal SA formed of serial binary elements (e.b.) and, on the other, a clock signal $H_B$ at the rate of the address signal's binary elements. These two signals are applied to a memory logic circuit 4, which is mainly intended to initial the device on the one hand and to supply to the programmable control device 5 on the other either the address supplied by the address signal or the address, pre-recorded in circuit 4, of the image to which access is required, the discharge of logic circuit 4 being done through multiple link BA on the calls, formed by pulses LM, which are supplied by the computer device which can be programmed to read these data. This memory logic circuit works at the rate $H_c$ of the clock in the programmable control circuit and hence these clock pulses are applied to logic circuit 4.

The programmable control device 5 receives the start and finish point data BD and BF coming from reading device 1 and supplies control signals for step by step operation or stopping on an image MAV, MAR and AI to a fine search interface 7 and control signals for fast operation MAV.R and MAR.R to a rough search interface 6, the letter R indicating fast operation control signals. This device also supplies a number $n$ computed and stored in a memory to rough search device 6 on the instruction LN, which is supplied by the programmable control device too; $n$ is the number of steps the reading head shifts in fast movement. This number is equal to the difference between the address read in the start position and the final address of the image to which the device should go automatically.

The operation of the device is roughly as follows: after initialing the device by recording in memory logic circuit 4 the address $a_x$ of the image to be read, this address is transferred to the programmable control device which compares it with the initial address $a_o$ that was read and detected, the reader being then stopped on the image. If $n = (a_x - a_o)$ is greater than a predetermined number $m$ (10 for example), the programmable control system, through the rough search interface, orders the fast movement of the reading head to address image $a_x$. This fast movement is stopped when the number of tracks jumped reaches $n$. There is then a stop on an image and detection of a new address $a_o$ corresponding to the new position of the reading head. If $(a_o - a_x)$ becomes less than $m$, the rough search phase stops and the device is then in the fine search phase. The control device supplies to the fine search interface signals ordering a stop on the image or forward or backward movement, the latter corresponding for the reader to track jumps forward or backward. The address of each image is detected and compared with $a_x$ at each step.

In this short description, end points data have not been taken into account.

The more precise operation of the automatic access device complying with the invention will be described in connection with the more detailed but non-limiting drawings showing the elements of the block schematic in FIG. 2.

Figure 3:
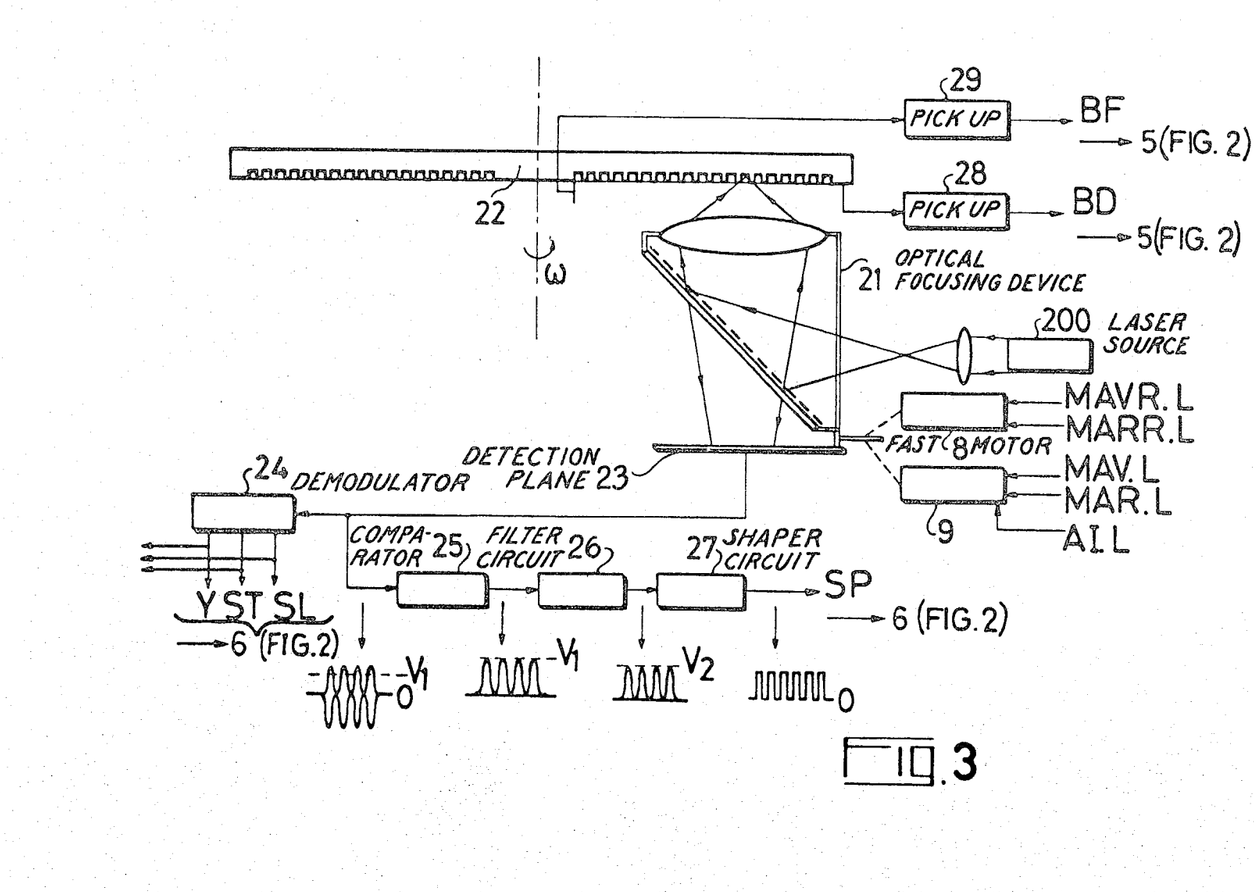
FIG. 3 shows a video disc reader 1 as in FIG. 2 containing a device counting the grooves of the track crossed.

The reading device is shown schematically in FIG. 3. The description of this device is given as a non-limiting example. In particular, the disc is assumed to be readable by reflexion but for a disc readable by transmission, a transmission reader of a known type may be used. The device contains a laser type source 200, an optical focusing device 21, for projecting the radiation on the disc, shown as an example as consisting of a lens, a partly reflecting plate and a reading objective that focusses the radiation it receives on the face of disc 22 which bears the data. As the disc is assumed to be readable by reflextion, the radiation reflected by the disc face bearing the impression passes through the objective and partly reflecting plate again and is detected by detection cells suitably placed in plane 23.

When this reading device is operating, disc 22 rotates around its axis at a constant angular velocity $\Omega$. The corresponding motor is not shown on the figure. Also, in classical fashion in a video disc reader, a radial position servo-control loop is provided so that the reading spot remains on the track during reading, the track being assumed to be a spiral one. This loop is not shown on FIG. 3.

As the purpose of the invention is automatic access allowing the reader to stop on a prearranged image, the device also includes a step by step or continuous motor 9 allowing a stop on an image by a movement one track step backwards at the end of each turn. By suppressing one of these backward jumps periodically at the end of a turn, this motor also allows a step by step forward movement and by adding a jump of one step backwards after a half turn to the jump backwards at the end of the turn, it makes possible step by step or continuous backward movement.

A fast motor 8 is able to drive the reading head in fast movement along a radial direction of the disc in one direction or the other as a function of the control signal MAV.R.L or MAR.R.L which is applied to it.

During fast movement, the radial servo-control loop is open whereas, during a stop on an image, this loop is closed so that, apart from the instants when step jumps are being performed, the reading spot follows the track. Thus it is possible to detect the addresses, previously recorded on the disc, during the fine search phase.

The reading signal supplied by the reading cells 23 is demodulated by demodulator 24, during track reading (disc rotation with radial servo-control of track following) in normal reading conditions, a stop on an image or fine search (jump of one step at a time forward or backward), to give video signal Y, the frame synchronizing signal and the line synchronizing signal.

These signals are supplied to address detector 3 in FIG. 2.

During the rough search phase, the reading head has a fast movement, the disc rotating at its normal speed, and hence the reading spot crosses grooves quickly. The reading device complying with the invention contains a device for counting the grooves crossed on a disc radius during fast movement of the reading head. This device uses the reading cells' output signal; this signal, which is unsuitable for reading data, contains a series of bursts of high frequency separated by periods without a signal of about the same length as the bursts.

Each H.F. burst corresponds to the reading head passing vertically over a groove of the track.

The counting device contains a first comparator 25 of an adjustable threshold voltage $V_1$ which receives the output signal from the reading cells, an integration and low pass filter device 26 and a shaper circuit 27.

The threshold of comparator 25 is adjusted above the level of the noise in the reading signal during the intervals corresponding to unrecorded zones and below the lowest peaks of the high frequency signal bursts. This threshold detector then delivers calibrated bursts of constant amplitude. Integration and filter circuit 26 then supplies pulses each of which corresponds to the crossing of a groove. Shaper circuit 27 delivers pulses whose levels are compatible with the logic levels of a counter. This counter has been shown included in the rough search interface 6 of FIG. 2. The device also contains picks up 28 and 29 which supply signals BD and BF when the reading spot reaches the ends of the recorded disc, BD being the signal corresponding to the start of the track and BF the one corresponding to the end.

Figure 4:
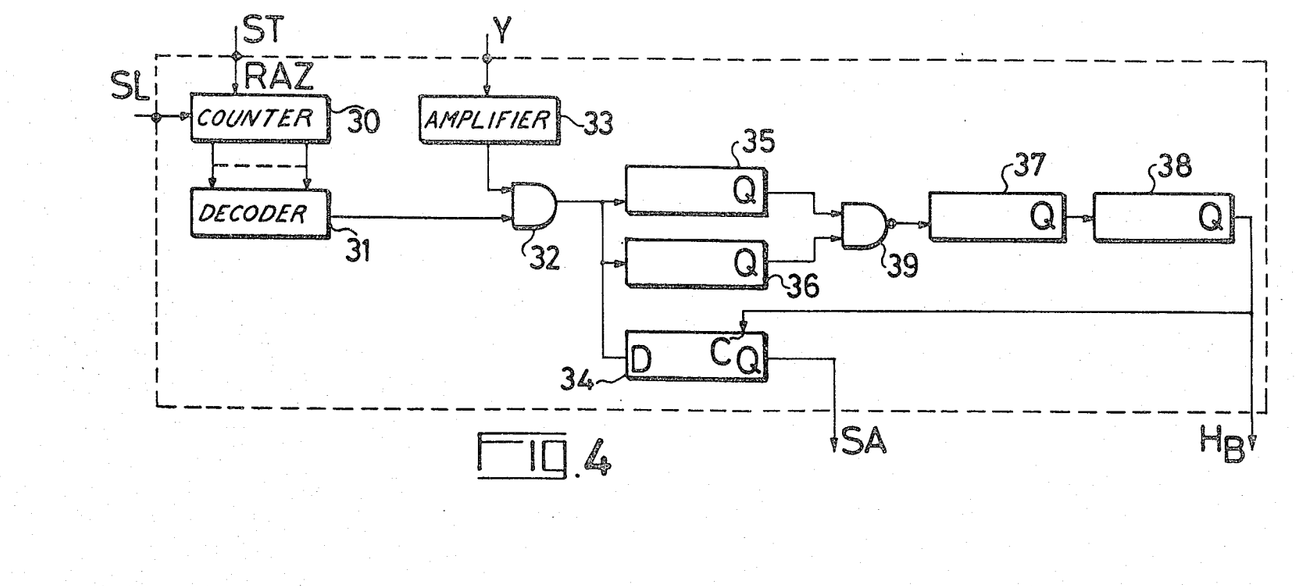
FIG. 4 shows a detailed schematic of the address detector 3 in FIG. 2

The drawing of address detector 3 in FIG. 2 is shown in FIG. 4. On this drawing, the signals received and supplied are represented by the same symbols as in FIG. 2. It was said above that the addresses were recorded beforehand on the disc using a two-phase polarized code which has the advantage of not requiring the transmission of a D.C. component. It was also said that the address of each image was recorded on the disc in lines 16 and 329 for a 625 lines standard.

Figure 5:
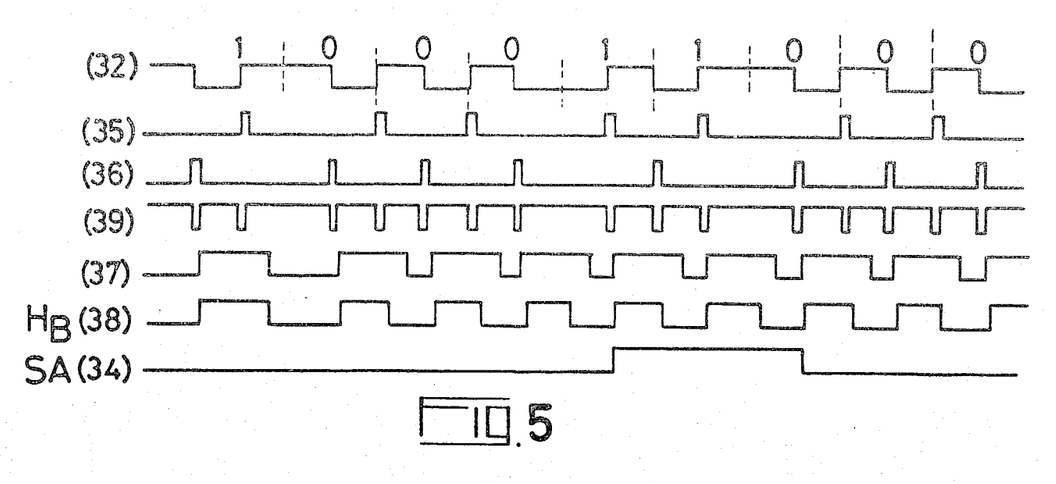
FIG. 5 is the diagram of signals detected at different points in this detector.
Figure 6:
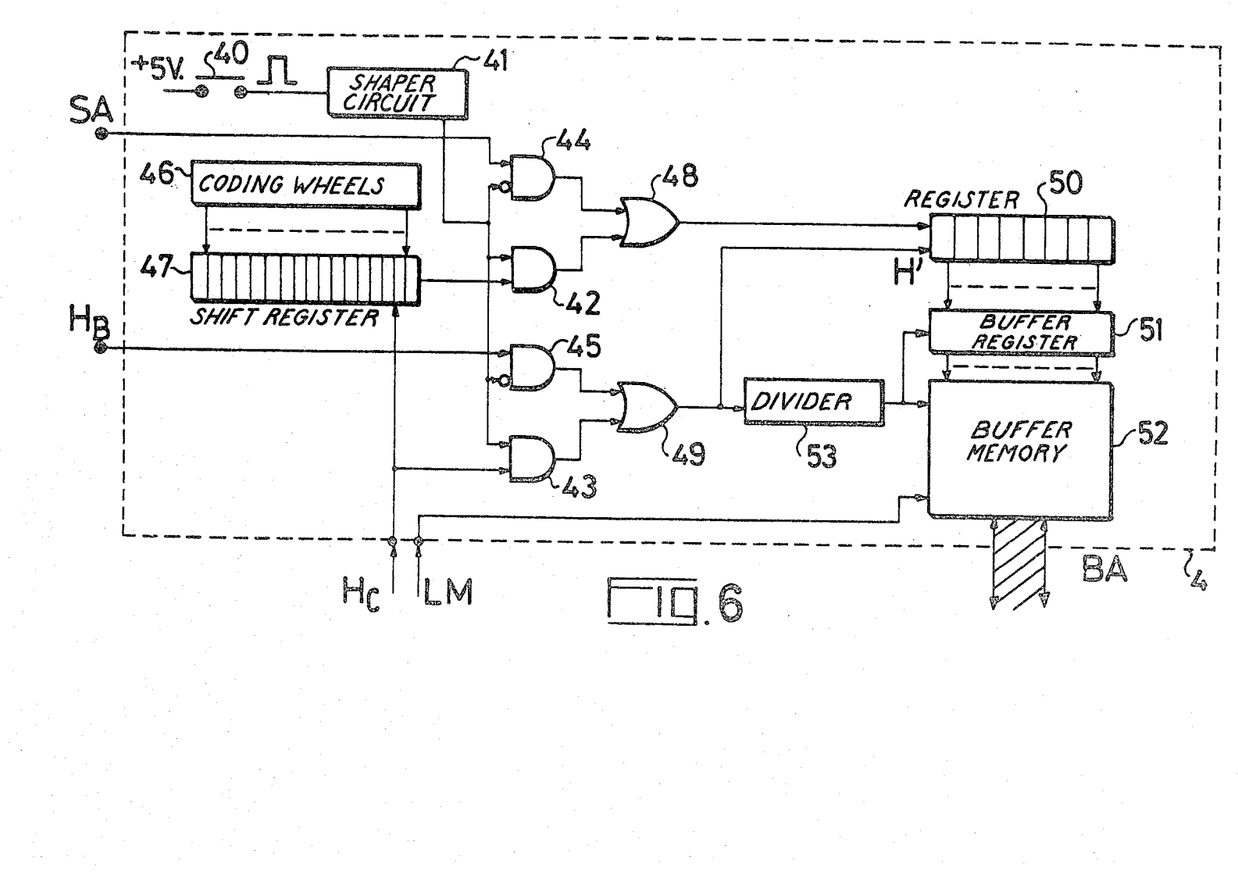
FIG. 6 is a detailed schematic of the memory logic circuit 4 in FIG. 2.

Address detector 3 contains a counter 30 which receives the line synchronizing pulses SL and counts them. This counter is reset to zero by the frame synchronizing pulses. The parallel outputs of this counter are connected to the inputs of decoder 31 which supplies a square wave for the lengths of lines 16 and 329. This signal is applied to the first input of AND gate 32 which receives at its second input the luminance signal Y reduced to logic levels TTL by a limiter amplifier 33. The address signal SA which is coded in two-phase is available in serial form at the output of this AND gate at the frequency of clock signal $H_B$. A logic device containing four monostable circuits 35, 36, 37 and 38, a type D flip-flop 34 and a NAND gate 39 is used to decode the two-phase signal. Circuits 35 and 36 supply short pulses from the leading and trailing edges respectively of the output signal of AND gate 32; circuit 37 opens up on the leading edges and supplies a logic "1" signal for a time slightly longer than the half period of clock $H_B$; circuit 38 supplies a clock signal $H_B$ of unity cyclic ratio which is applied to the clock input C of type D flip-flop 34. The time diagram of the output signals from these various elements is given in FIG. 5, the signals being identified by the identification numbers of the elements supplying them. The output signal of type D flip-flop 34 is the address signal coded for no return to zero to within the first bit transmitted, which is eventually lost and must not therefore be used for the address; it must be considered as a bit making possible the synchronizing of the address detector device. As was indicated above, since the address is recorded in BCD, the number of images (about 40,000) requires the detection of 20 binary elements. These 20 elements are transmitted in serial form at the rate of clock $H_B$ to memory logic circuit 4 of FIG. 2 whose detailed schematic is shown in FIG. 6.

Circuit 4 contains an initialing circuit with a pushbutton 40 which supplies an initialing pulse to a shaper circuit 41. The output of circuit 41 is connected to the first inputs of two AND gates 42 and 43 and to the first inputs with inversion of two other AND gates 44 and 45. The second inputs of gates 44 and 45 receive the address signal detected SA and clock signal $H_B$ respectively while the second inputs of gates 42 and 43 receive the output signal of a shift register 47, shifted at the rate of clock signal $H_O$, and clock signal $H_C$ respectively. Shift register 47 has 20 stages and its content is a function of the decimal number recorded on coding wheels 46 which convert each digit of the decimal number into a 4-element binary number. The number which is recorded is the address of the image at which the device is to stop. i.e. $a_x$. The outputs of AND gates 42 and 44 are connected to the two inputs of OR gate 48 which then supplies at its output the serial binary signal corresponding to $a_x$ or the serial binary signal SA corresponding to the address read which may be either $a_o$, if the device has just been started, or some other read while finding its position. This address is called $a_{11}$ if it is read on the first frame of an image and $a_{12}$ if it is read on the second frame of the same image. This serial binary signal is applied to the input of register 50, which has a serial input and parallel outputs, the register being shifted at the rate H', where H' is the output signal of OR gate 49 whose inputs are connected to the outputs of AND gates 43 and 45. Hence H' is at the rate of $H_B$ or $H_C$ depending on the address signal which appears at the input of register 50. The programmable control system generally works on octets in logic systems. Recording of address signals is therefore done by groups of 8 binary elements. For this purpose, register 50 has 8 stages and its outputs are connected to the inputs of a locking buffer register 51 whose stages are loaded with the contents of the corresponding stages in register 50 at the rate of H' divided by 8 by means of divider 53. The buffer register outputs are connected to the inputs of a buffer memory 52 arranged in octets and their states remain unchanged until the next clock pulse. Memory 52 has a synchronizing input for loading with the contents of register 51, this input being connected to the output of divider 53, and a transfer control input LM for transferring the content of the last register in the buffer memory to a bilateral multiple link, the bus BA, designed to ensure the transfer of data to the programmable control system. This read instruction LM comes from the programmable control system.

Figure 7:
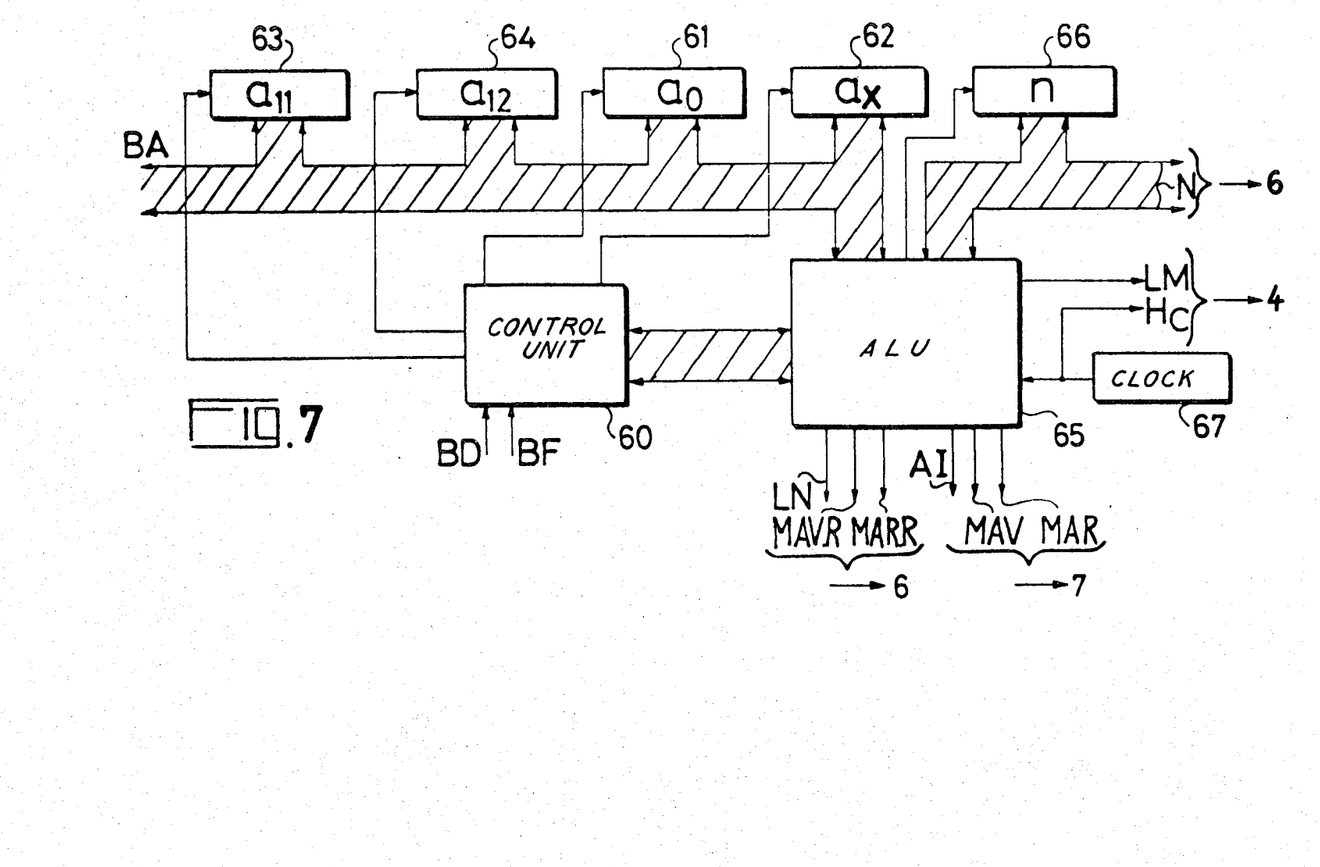
FIG. 7 is a schematic of the programmable control device 5 in FIG. 2.

The drawing of the organization of the programmable control system is shown in FIG. 7. It contains mainly a control unit 60, which is programmed according to the flow-chart in FIG. 10. This receives the end point signals BD and BF and supplies, in the various useful memories 61, 62, 63 and 64, on the one hand, instructions to write the addresses present in address bus BA at given instants and, on the other, "work" instructions which are transmitted to an arithmetic and logic unit 65. Memories 61, 62, 63 and 64 are intended to record respectively the address $a_o$ of the initial image read before any movement of the reading head, the address $a_x$ of the final image on which it is desired to stop, the address $a_{11}$ read after a movement of the reading head over the first frame of the image and the address $a_{12}$ read on the second frame of the image.

Bus BA connects these various memories to arithmetic and logic unit 65 which is to operate on the corresponding data on instructions received from programmed control unit 60 to obtain the difference $n$, test this difference with respect to a predetermined number and finally register $n$ in an additional memory 66 if necessary. A write instruction is then transmitted by arithmetic and logic unit 65 to memory 66 so that the latter will take into account the state of bus N. This arithmetic and logic unit functions by means of an $H_C$ clock 67 and supplies read instructions LN to memory 66, which is intended for the rough search interface described above, and finally the control signals MAV.R, MAR.R, MAV, MAR and AI.

It may be noted that the various memories 61, 62, 63 64 and 66 are cut off or opened up depending on whether their content is to remain unchanged or to be modified.

Figure 8:
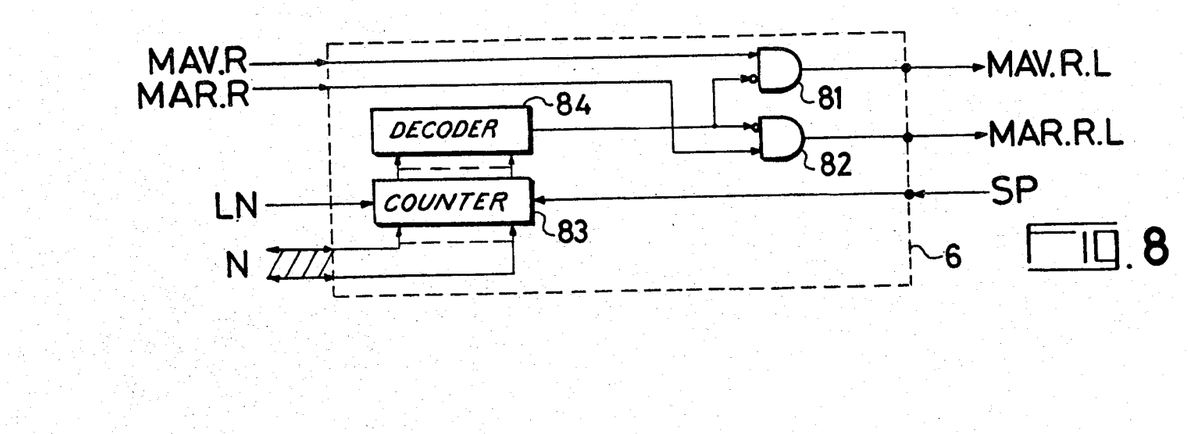
FIG. 8 shows the rough search interface 6 in FIG. 2.
Figure 9:
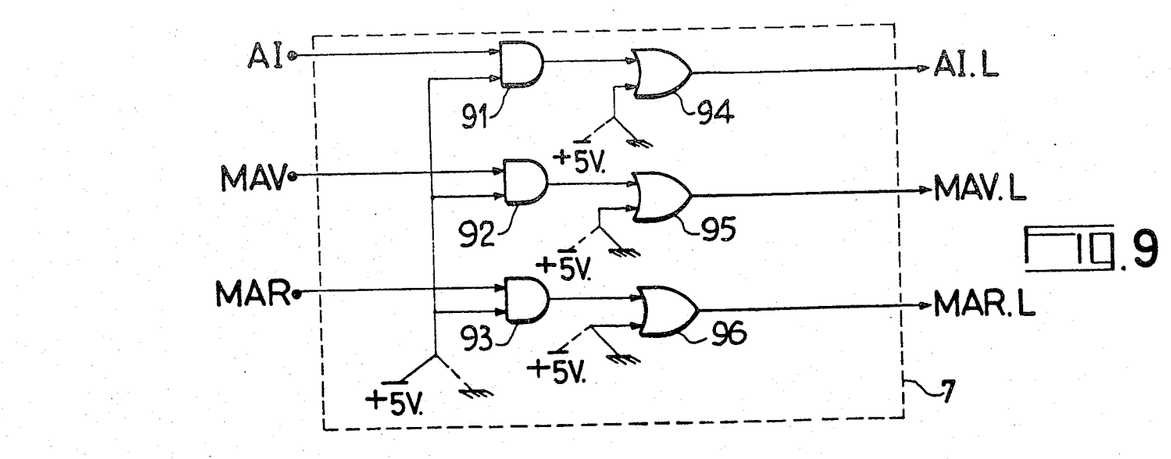
FIG. 9 shows the fine search interface 7 in FIG. 2.

The rough and fine search interfaces, which are 6 and 7 respectively on FIG. 2, are shown on FIGS. 8 and 9.

On FIG. 8, the control signals for fast forward and backward movements coming from arithmetic and logic unit 65 are applied to the non-inverted inputs of two AND gates 81 and 82.

A counter 83, which is originally loaded by link N on the read instruction of N, LN, coming from arithmetic and logic unit 65, receives from the reader pulses corresponding to the track jumps SP. When $n$ pulses have been received by counter 83, the latter is in the 0 state and a decoder 84, whose inputs are connected to the outputs of counter 83, decodes this 0 state and supplies a pulse, to stop the fast movement, which is applied to the inverted second inputs of AND gates 81 and 82 and thus stops the fast movement of the reader.

On FIG. 9, the control signals for forward and backward movement and stop on an image are applied respectively to the inputs of the slow search interface, which is merely a manual-automatic switch that enables the reader to be controlled manually (this excluding an automatic search for images). This interface has 3 AND gates 91, 92 and 93 which receive AI, MAV and MAR respectively on their first input and the same 0 and 1 logic level on their second input, and 3 OR gates, 94, 95 and 96, whose first inputs are connected to the outputs of AND gates 91, 92 and 93 respectively, the second inputs of these OR gates receiving a 1 or 0 logic level chosen by the operator in the case of manual operation. The output signals, MAV.L, MAR.L and AI.L of this interface, which are applied to the reader, are characterized by 0 logic levels (ground) for inaction and 1 levels (5V) for action. These 3 signals cannot all have active levels simultaneously.

An example of a simple sequence which might be programmed in the control unit is given below in the form of successive operations concerning either a calculation or a test in the computer unit or instructions for moving the reading head. The sequence interrupt instructions required during the running of the corresponding movements and the signals received by the control unit for continuing to run the sequence have not been shown for simplification purposes. Management of the system is easy for a man skilled in the art.

Figure 10:
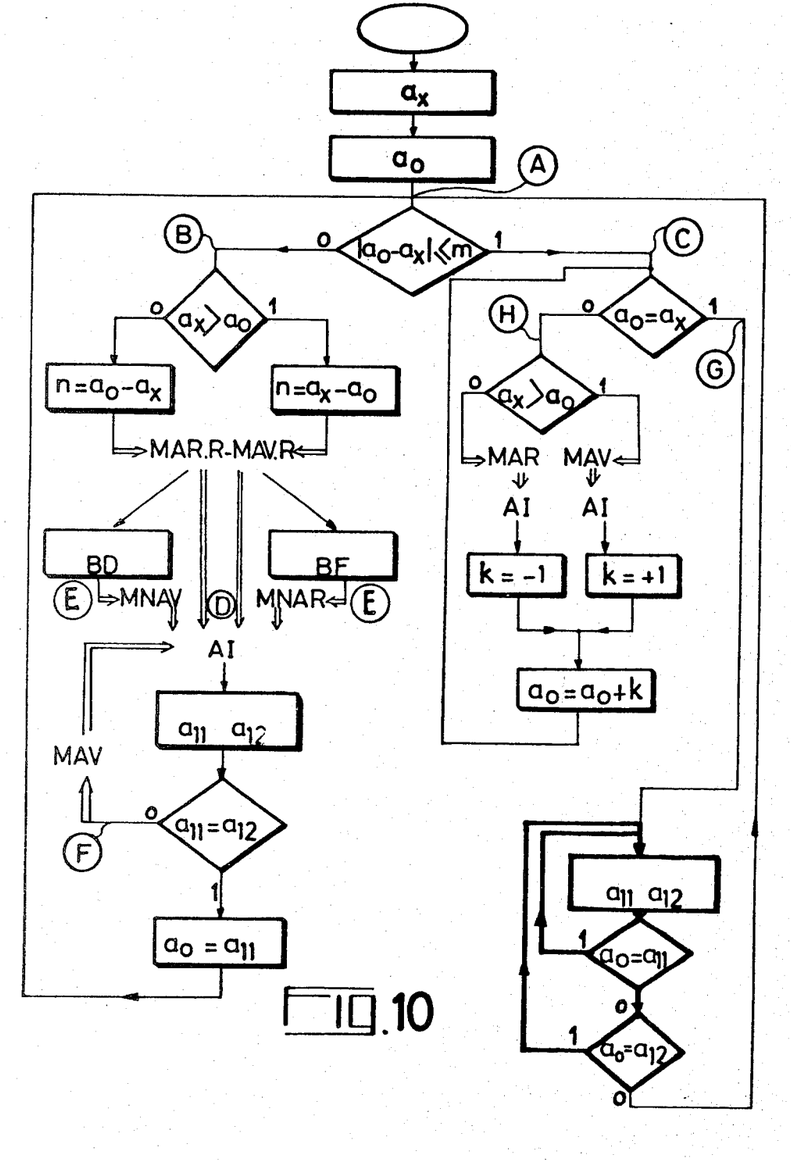
FIG. 10 is an explanatory schematic of the operation of the automatic access device in accordance with the invention.

The sequence is explained in conjunction with the diagram showing the operation, which is given in FIG. 10, and the drawings of FIGS. 3, 4, 6, 7 and 8. On FIG. 10, the indication "1" follows a positive test and the indication "0" follows a negative test. The twin arrows correspond to instructions transmitted elsewhere. A stop on an image has been considered as the reader's rest position, i.e. after a fast forward or backward movement, a slow forward or backward movement (a step jump) or normal foward or reverse running in the framework of the automatic access device (i.e. only until an address is detected), the reader is brought to stop on image as this state allows the detection of the addresses recorded on the disc. In the absence of reference to a stage identified by a letter, the succession of the various stages is obtained by the passing from one stage to the following one:

recording of $a_x$ by means of coding wheels 46 (FIG. 6), detection of $a_o$ by means of address signal SA, reading and writing of $a_o$ and $a_x$ in the corresponding memories (FIG. 7), A: calculation of $(a_x - a_o) = n$ and test with respect to a predetermined value $m$ : then to B or C, B: if $n$ is greater than $m$ : start of the rough search phase:

fast movement of the reading head $n$ track steps in the direction determined by the sign of $a_o - a_x$, count of the tracks crossed (FIG. 8), stop of the movement when the number of tracks crossed is equal to $n$ (to D) or when the reader sends a stop point signal (to E) (FIGS. 8 and 7), D: stop on the corresponding track groove, reading of two addresses recorded in succession and comparison of them. If they are the same, storing or memory $a_o$ by this common value and return to A; if they are different, to F, F: normal half-turn advance; to D, E: instruction for normal advance in the opposite direction to the fast movement until addresses are detected: then to D, C: if $n$ is less than or equal to $m$ : fine search phase, comparison of $a_o$ with $a_x$. If the two addresses are equal, to G. If they are different, to H, H: sign of the difference $(a_x - a_o)$ and jump of a track step forward or backwards depending on the direction of the difference, instruction to stop in the same track groove, increase or decrease in the content of register $a_o$ by one unit depending on the direction of the step jump $a_o = a_o + k$ in which $k = \pm 1$, return to C, G: stop on the track groove corresponding and detection of the two addresses recorded, comparison of one of the addresses detected with the contents of $a_o$. If equal, return to the start of G, if unequal, comparison of the contents of $a_o$ with the second address detected. If equal, return to the start of G, if unequal, (the reader has made an unwanted jump) return to A to start a new search cycle.

On the flow-chart of FIG. 10, the links shown with a heavy line represent the running of the tests carried out when the automatic access device has caused the reading head to be placed on the data required.

The tests continue to be carried out so that, if the head makes an unwanted shift or new data are to be sought, the access device allows an automatic adjustment.

A stop to the fast movement is obtained within the framework of the device described when the number of tracks crossed is equal to the number $a_x - a_o$; to allow for the lag between the instant when a stop is ordered and the instant when the fast movement really stops, it is possible to order a stop when the number of tracks crossed is equal to $n - p$, $p$ being a number predetermined to take into account the device's inertia. Thus the reading head is placed at the end of a fast movement in the immediate neighbourhood of the track groove required.

The invention is not limited to the application mode described and shown. In particular, in a simplified device it is possible to record the corresponding address only one per track rotation. Also, it was assumed that the track was in the form of a spiral, the stop on an image being obtained by one step backwards at the end of each image. This is the usual arrangement for recording and reading video signals. However, for a data processing application for example, the information recorded then being data, it is possible to record these data on a track formed of circular grooves. The stop on an image is then automatic. The forward movement, like the backward movement, must then be obtained by pulses.

It is also possible to improve the device by including a warning system for the disc user, operating for example during the fine search phase, when two addresses read on the same track turn are different from the one previously read increased or decreased by the step jump made.

Other improvements can be made without going outside the framework of the invention. In particular, it is possible to provide a device which indicates, after a stop at the disc end point, that the address recorded $a_x$ is greater than the maximum address recorded on the disc.

Also, in the device described it was assumed that the addresses were recorded on one line in each frame, lines 16 and 329. In the framework of a reading device using a correction system in which, when a drop-out occurs, the missing part of the signal in a line is replaced by the correponding part of the signal in the previous line, address recording can then be done on lines 15 and 328 too. Thus the address data will remain even when there is a reading fault and the automatic search will not be interfered with.

What we claim is:

1. An optical reader for data carrier disc, said data being recorded along a track formed of concentric grooves, said track containing a succession of alternate elements optically detectable, adresses for said grooves formed by coded numbers being recorded at the same time as said data on each corresponding groove, said optical reader comprising a radiating source, a reading head intended to receive the radiation and to focus it on said track, a rotating device causing said disc to rotate, a detecting device for detecting the radiation coming from said track and supplying an electrical signal, a demodulation device, for demodulation said electrical signal, having an output delivering a demodulated signal and a device for automatic access to the data recorded on said disc, said automatic access device comprising an address detection device intended to supply a detected address formed by a coded number, a rough search device to position said reading head from an initial groove to a predetermined distance from the track groove required, said required groove being identified by the recording of its address $a_x$ in a memory logic circuit, and a fine search device intended to make the said recorded address $a_x$ and the detected coincide.

2. An optical reader for data carrier disc as claimed in claim 1 wherein said rough search device comprises a radial motion device ensuring the fast movement of said reading head radially with respect to the disc having an input for receiving a control signal, a counting device for counting the grooves crossed during said fast movement, said counting device having an input for receiving said demodulated signal and an output supplying a series of pulses, each of said pulses corresponding to the crossing of a groove of said track.

3. An optical reader as claimed in claim 2, wherein said counting device comprises a threshold detection circuit having an input connected to the output of said detecting device and an output for supplying bursts of high frequency wave of calibrated amplitude, an integration and low pass filter circuit having an input connected to the output of said threshold circuit and an output, and a shaping circuit having an input connected to the output of said threshold circuit and an output which is said output of said counting device.

4. An optical reader as claimed in claim 2, wherein the operation of said rough search device is as follows: to count the number of grooves to be crossed to pass from the said initial groove to the said required groove, to start the said fast movement, to compare said number of grooves to be crossed with the number of grooves crossed during the said fast movement, said number having been counted by said counting device, and to stop the said movement when the two numbers are equal.

5. A data disc optical reader according to claim 1, wherein said groove addresses are recorded on the said disc in two-phase binary code.

6. A data disc optical reader according to claim 1, wherein said address of a groove is recorded twice per groove in two diametrically opposite zones.

7. A data disc optical reader according to claim 1, wherein said addresses being repeated in two consecutive contiguous zones, the second zone being used for normal reading and replaced by the first zone when there is a fault in reading the said second zone, said optical reader further comprises a fault correction device which replaces the data recorded on a zone of the track by data recorded on the preceding contiguous zone.

8. A data disc optical reader according to claim 1 wherein said rough search device comprises a circuit for computing the difference $n$ between said address $a_x$ and an address $a_o$, which is detected and recorded before any movement and after each movement of said reading head, a comparator circuit for comparing $n$ with a predetermined number $m$, which is small compared with the total number of grooves in the track and supplying a control signal having one of two values according to the sign of the difference $a_x - a_o$, a control signal to fast translation device when $|a_x - a_o| - n > m$, said control signal being one or the other of two given signals depending on whether $a_o$ is less than or greater than $a_x$ and a control signal for the said fine search device when $n \leq m$, said rough search device also having a comparator circuit, which is coupled, on the one hand, to said output of said device counting the grooves crossed and, on the other, to the output of said computing circuit which is intended to supply a stop signal to said fast motion device.

9. A data disc optical reader as claimed in claim 8, wherein said comparator circuit is a counter-discounter initialed by a number, which is a function of $n$, having a discount input for receiving the output signal from said device counting the tracks crossed, said counter-discounter supplying said stop signal when its content has been reduced to zero.

10. A data disc optical reader as claimed in claim 9, wherein said number, which is a function of $n$, is $n$ itself.

11. A data disc optical reader as claimed in claim 10, wherein stop points for beginning and end of said tracks are provided on the disc at the track ends to stop said fast movement when the reading spot reaches them, said optical reading head then being brought back to the track until the said address detection device detects the first address met.

12. A data disc optical reader as claimed in claim 6, wherein said address detection circuit detects said addresses recorded on two zones diametrically opposite in two consecutive half-grooves, the corresponding results being recorded in said memory logic circuit and compared one with the other by comparison means which order a half-groove advance when the two results are different.

13. A data disc optical reader as claimed in claim 4 further comprising a device for shifting radially said reading head in one direction or the other a distance equal to the step between two successive concentric grooves said fine search device comprising means for comparing the said address $a_x$ with an address $a_o$, which is detected and recorded after each movement of said reading head, said means supplying a first, second or third control signal to the said radial shift device depending on whether $a_x = a_o$, $a_x < a_o$ or $a_x > a_o$, the first control signal causing the reader to stop on the same track turn while the second and third control signals trigger respectively a backward or a forward movement of one track step and fresh detection of the address read causes a fresh fine search cycle.

14. A data disc optical reader as claimed in claim 13, wherein a stop is provided at the end point of said track, a stop at the end point of said track after a forward movement of one step of the track causing said automatic access device to stop, the address recorded then being greater than the address of the last groove on the said track.

15. A data disc optical reader as claimed in claim 13, wherein the address of a groove has been recorded once per groove, said shift device shifting the said reading head groove by groove.

16. A data disc optical reader as claimed in claim 13, wherein said shifting device shifts the reading head one step for each half-groove.

17. A data disc optical reader as claimed in claim 16 wherein after fresh detection of the address read, a comparator device compares in a first phase the first address read on the said track's half-groove corresponding to the address $a_o + k$, $a_o$ being the address which was read previously and $k$ being equal to $+ 1$ when the control signal has triggered a forward movement and to − 1 when the control signal has triggered a backward movement of one step, the said address $a_o + k$ being the new starting address when there is coincidence; if there is no coincidence, the said comparator device compares in a second phase the address read on the half-groove following the said address $a_o + k$, the address $a_o + k$ then being the new starting address when there is coincidence; if there is no coincidence, said comparator device compares in a third phase the address $a_x$ with the address $a_o + k$.

18. A data disc optical reader as claimed in claim 17 wherein said first control signal triggers, at the same time as it stops the reader on the same track groove, the address detection circuit and a device comparing the address read with the preceding address which causes a stop on the same track groove when there is coincidence and a comparison of $a_o - a_x$ with $m$ when there is no coincidence which is likely to occur when there is a reading fault because the reading head has jumped.

19. A data disc optical reader as claimed in claim 18 wherein said track is formed of circular grooves, a stop on a groove in the said track is obtained by stopping the said reading head.

20. A data disc optical reader as claimed in claim 18 wherein said track is in the form of a spiral, a stop on a groove in the said track is obtained by shifting one step which brings the reading head at the end of each turn to the start of said groove.

21. A data disc optical reader as claimed in claim 20 wherein said automatic access device contains a programmable computing device which receives the addresses detected by the said address detection circuit and supplies to said rough and fine search devices a control signal chosen from among the said prearranged signals and the said first, second and third control signals depending on the state of advance of said search and the result of programmed tests of the relative values of the said addresses detected and computed and of the said recorded address.

* * * * *